US012773799B2

(12) United States Patent
Wu et al.

(10) Patent No.: US 12,773,799 B2
(45) Date of Patent: Oct. 27, 2026

(54) CONVENIENT PORTABLE KNIFE

(71) Applicant: CUTTWAY PRODUCTS CO., LTD., Taichung City (TW)

(72) Inventors: Race Wu, Taichung City (TW); Ivy Lin, Taichung City (TW)

(73) Assignee: CUTTWAY PRODUCTS CO., LTD., Taichung (TW)

( * ) Notice: Subject to any disclaimer, the term of this patent is extended or adjusted under 35 U.S.C. 154(b) by 136 days.

(21) Appl. No.: 18/754,982

(22) Filed: Jun. 26, 2024

(65) Prior Publication Data

US 2025/0367839 A1 Dec. 4, 2025

(30) Foreign Application Priority Data

May 30, 2024 (TW) ................................ 113119960

(51) Int. Cl.
*B26B 1/04* (2006.01)

(52) U.S. Cl.
CPC .................................... *B26B 1/042* (2013.01)

(58) Field of Classification Search
CPC ......... B26B 1/042; B26B 1/044; B26B 1/048; B26B 1/04; B26B 1/02
See application file for complete search history.

(56) References Cited

U.S. PATENT DOCUMENTS

| | | | | |
|---|---|---|---|---|
| 6,701,626 | B2 | 3/2004 | Knoop | |
| 7,062,857 | B1 * | 6/2006 | Nenadic | B26B 1/042 30/298.4 |
| 7,469,476 | B2 * | 12/2008 | Demko | B26B 1/042 30/160 |
| 8,286,357 | B2 * | 10/2012 | Huang | B26B 1/048 30/160 |
| 9,751,222 | B2 * | 9/2017 | Kao | B26B 1/10 |
| 11,020,863 | B1 * | 6/2021 | Demko | B26B 1/042 |
| 11,305,440 | B2 | 4/2022 | Demko | |

* cited by examiner

*Primary Examiner* — Jennifer S Matthews
(74) *Attorney, Agent, or Firm* — MUNCY, GEISSLER, OLDS & LOWE, P.C.

(57) ABSTRACT

A convenient portable knife includes a knife handle and a cutting blade pivotally connected to the knife handle. The cutting blade has a locking groove. The knife handle is equipped with a swing arm and a locking bolt. The swing arm has a locking portion. The locking portion and locking bolt are located in the locking groove when the cutting blade is in the extended position. The locking bolt can move along the long axis of an elongated hole, allowing the swing arm to smoothly enter and exit the locking groove.

7 Claims, 10 Drawing Sheets

CONVENIENT PORTABLE KNIFE

BACKGROUND OF THE INVENTION

1. Field of the Invention

The present invention relates to knives, and in particular to a convenient portable knife that can be securely engaged and folded.

2. Description of the Related Art

Because of its convenience of storage and portability, foldable or portable knives are widely used in many places. For example, U.S. Ser. No. 11/305,440 discloses an outdoor knife with replaceable blades, U.S. Pat. No. 7,469,476 discloses a folding knife with a buckle that can slide back and forth, or U.S. Pat. No. 6,701,626 discloses a portable knife with replaceable blades for outdoor use. Although each of the above-mentioned patents has its own structures and purpose and has its own advantages and disadvantages, their common goal is to provide a convenient portable knife that is easy to operate and has a secure fit.

SUMMARY OF THE INVENTION

The main object of the present invention is to provide a convenient portable knife which is easy to operate and has a firm and clear engagement.

To achieve the above object, the convenient portable knife of the present invention comprises a knife handle and a cutting blade. The cutting blade is pivoted to the knife handle. The cutting blade comprises a locking groove. The knife handle comprises a swing arm and a locking bolt. The swing arm comprises a locking portion. The locking portion and the locking bolt are located in the locking groove when the cutting blade is in the extended position. The locking bolt can move along the long axis of an elongated hole, allowing the swing arm to smoothly enter and exit the locking groove. When the cutting blade is in the extended position, the locking groove, locking bolt and the locking portion can form a mutually squeezed state so that the cutting blade can be locked in place.

With the above structure, the convenient portable knife of the present invention can be locked stably by the continuous pushing and locking state formed by the locking groove, the locking bolt and the locking portion.

Preferably, the locking bolt is movable along the long axis of the elongated hole.

Preferably, both ends of the locking bolt are respectively provided with a small diameter section with a smaller outer diameter, and a shoulder surface with a reduced outer diameter is formed.

DETAILED DESCRIPTION OF THE INVENTION

Figure 1:
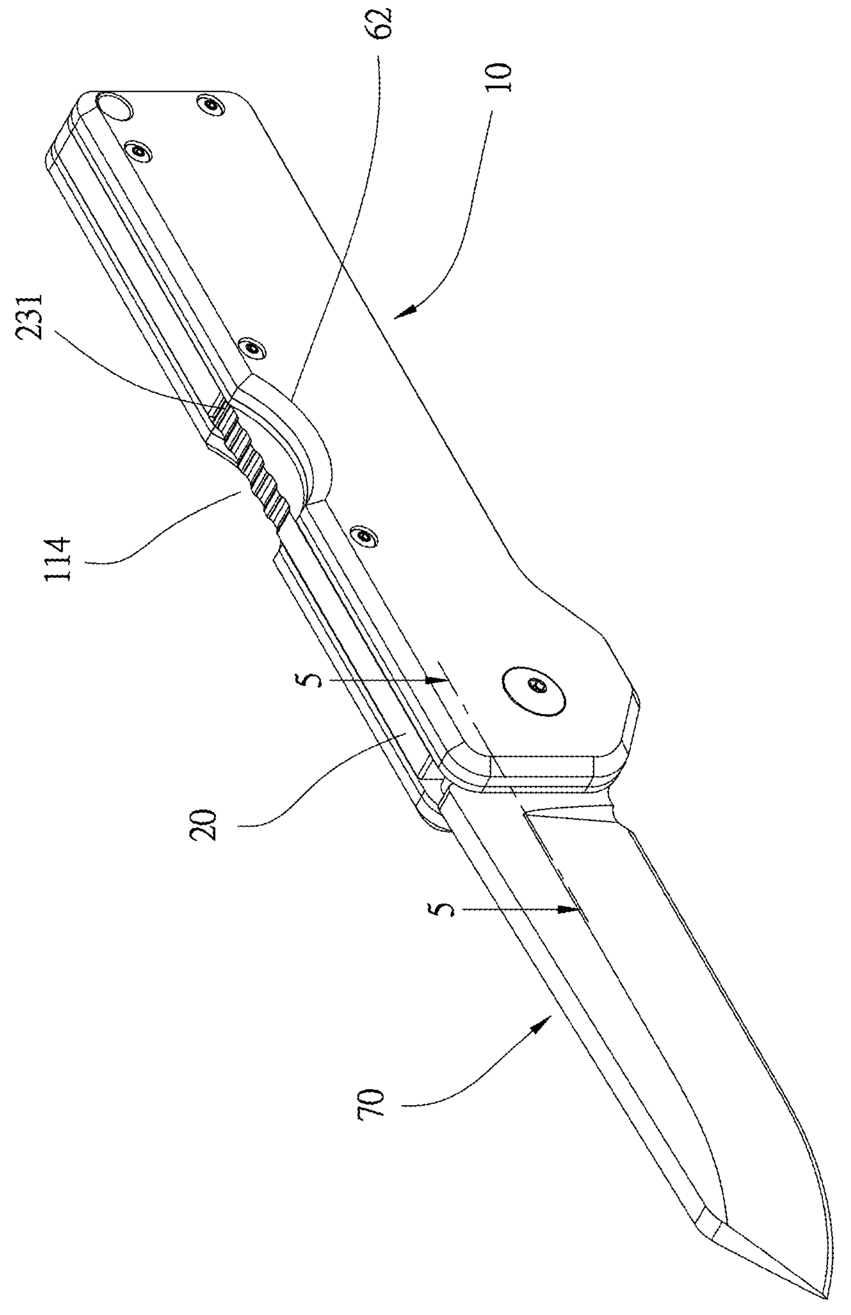
FIG. 1 is a three-dimensional schematic diagram of the present invention.
Figure 2:
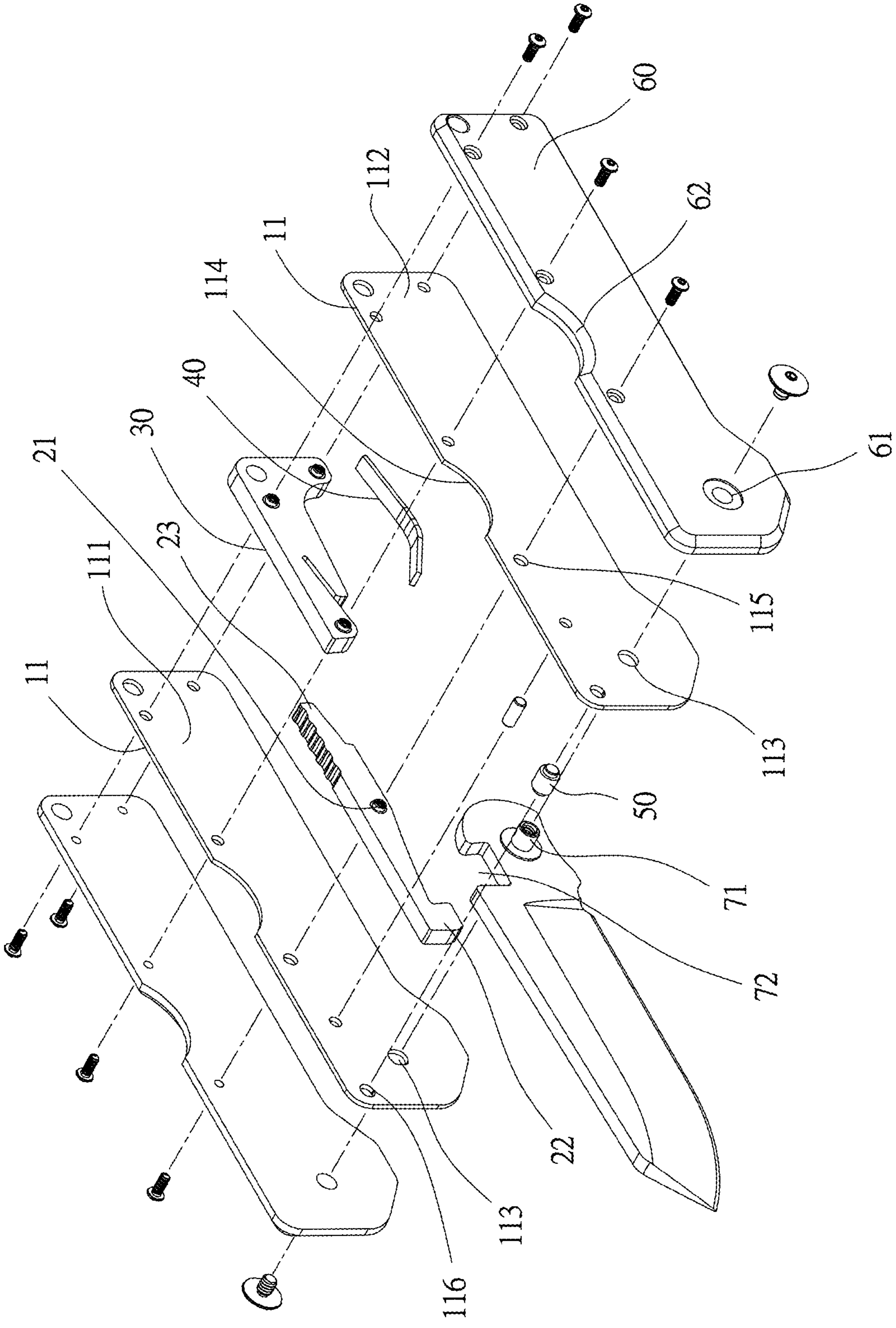
FIG. 2 is a three-dimensional exploded view of the present invention.
Figure 3:
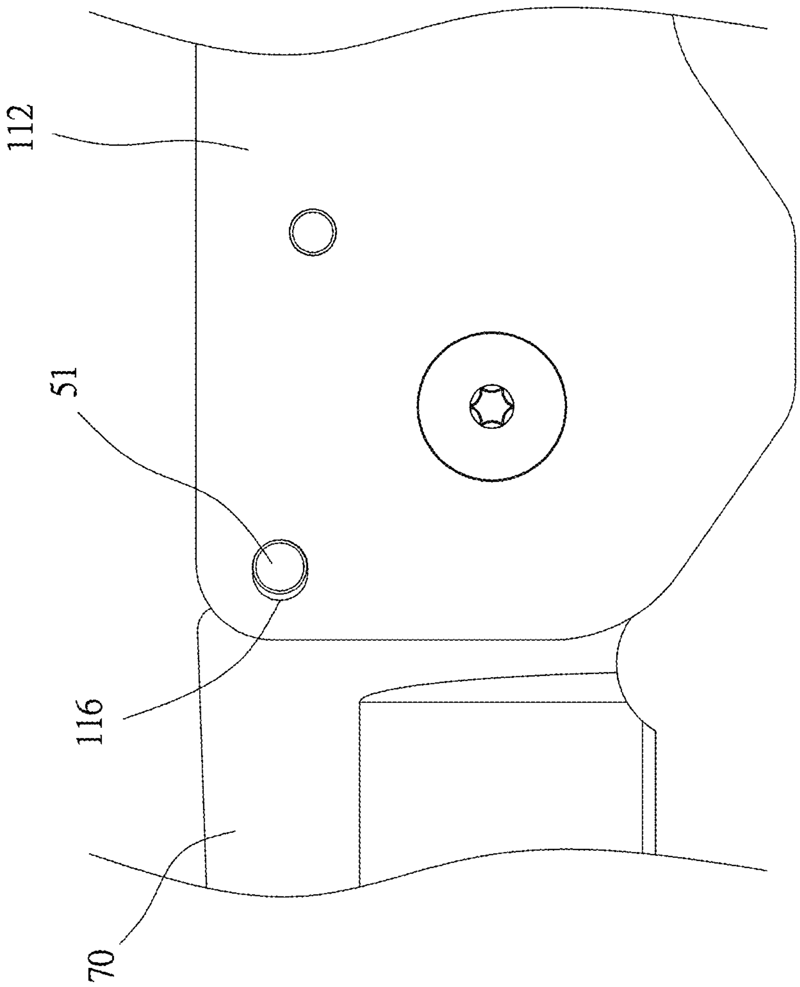
FIG. 3 is an enlarged side view of a part of the present invention, showing the position where the cutting blade and the knife handle are pivotally connected after the outer covers are removed.

The applicant first explains here that throughout the specification, including the embodiment described below and the claims in the scope of the patent application, the nouns related to directionality are based on the directions in the drawings. Secondly, in the preferred embodiment and drawings that will be introduced below, the same element numbers represent the same or similar elements or their structural features. The directions indicated in the specification are based on the directions of the drawings for ease of explanation and are not limited thereto.

Please refer to all drawings, the convenient portable knife of the present invention comprises a knife handle 10 and a cutting blade 70. The knife handle 10 comprises two side plates 11, a swing arm 20, a reinforcing plate 30, an elastic element 40, a locking bolt 50, and two outer covers 60.

The two side plates 11 are long and have the same structure and are symmetrical. The following description will take one side plate as an example. The side plate 11 has an inner side 111 and an outer side 112. One end of the side plate is provided with a pivot hole 113 for pivoting the cutting blade. A recess 114 is provided on one lateral side of the side plate. The side plate is further provided with an axle hole 115 and an elongated hole 116.

The swing arm 20 is elongated and sandwiched between the inner sides 111 of the two side plates. The swing arm 20 is provided with a pivot 21, and the pivot 21 is pivoted to the axle holes 115 of the two side plates. The two ends of the swing arm are respectively provided with a locking portion 22 and a pressing portion 23 that are respectively located on the two sides of the pivot 21. The locking portion 22 has a front abutting surface 221, a bottom surface 222 and a rear abutting surface 223. The bottom surface 222 protrudes from one side of the swing arm 20. The front abutting surface 221 and the rear abutting surface 223 are respectively located at two ends of the bottom surface 222, so that the front abutting surface 221, the bottom surface 222 and the rear abutting surface 223 form a protruding locking portion 22. The front abutting surface 221 of the locking portion is adjacent to the elongated holes 116 of the side plates. The pressing portion 23 is provided with an anti-slip strip 231 that is located at a position corresponding to the recesses 114 of the two side plates. The swing arm 20 can swing its two ends like a seesaw with the pivot 21 as the axis.

The reinforcing plate 30 is sandwiched between the inner sides 111 of the two side plates and is located at the end far away from the two side plate pivot holes 113.

The elastic element 40 is disposed on the reinforcing plate 30 and between the two side plates 11, and one end of the elastic element 40 abuts against the pressing portion 23 of the swing arm to provide a restoring force when the pressing portion 23 is pressed.

The locking bolt 50 is disposed between the two side plates 11 and has a small diameter section 51 with a smaller outer diameter at each of two opposite ends thereof, and a shoulder surface 52 with a reduced outer diameter is formed. The locking bolt 50 is respectively penetrated through the elongated holes 116 of the corresponding side plates by the two small diameter sections 51 so that the locking bolt 50 can move along the long axis of the elongated holes 116.

The two outer covers 60 are respectively disposed on the outer sides 112 of the two side plates, so that the two side plates 11 are located between the two outer covers 60. Each outer cover 60 is provided with a pivot hole 61 at a position corresponding to the side plate pivot hole 113, and each outer cover is provided with a recess 62 at a position corresponding to the side plate recess 114.

The cutting blade 70 is elongated and disposed between the inner sides 111 of the two side plates. A pivot 71 is provided at one end of the cutting blade. The cutting blade is pivoted on the pivot holes 113 of the two side plates with the pivot 71 and can rotate with the pivot 71 as the axis, and can be switched between an extended position and a folded position. The cutting blade 70 is provided with a locking groove 72 at the end where the pivot 71 is located. The locking groove 72 is a groove formed by a bottom 721, a front stop wall 722 and a rear stop wall 723. The locking groove 72 corresponds to the position of the elongated holes 116 of the two side plates when the cutting blade 70 is in the extended position.

Figure 4:
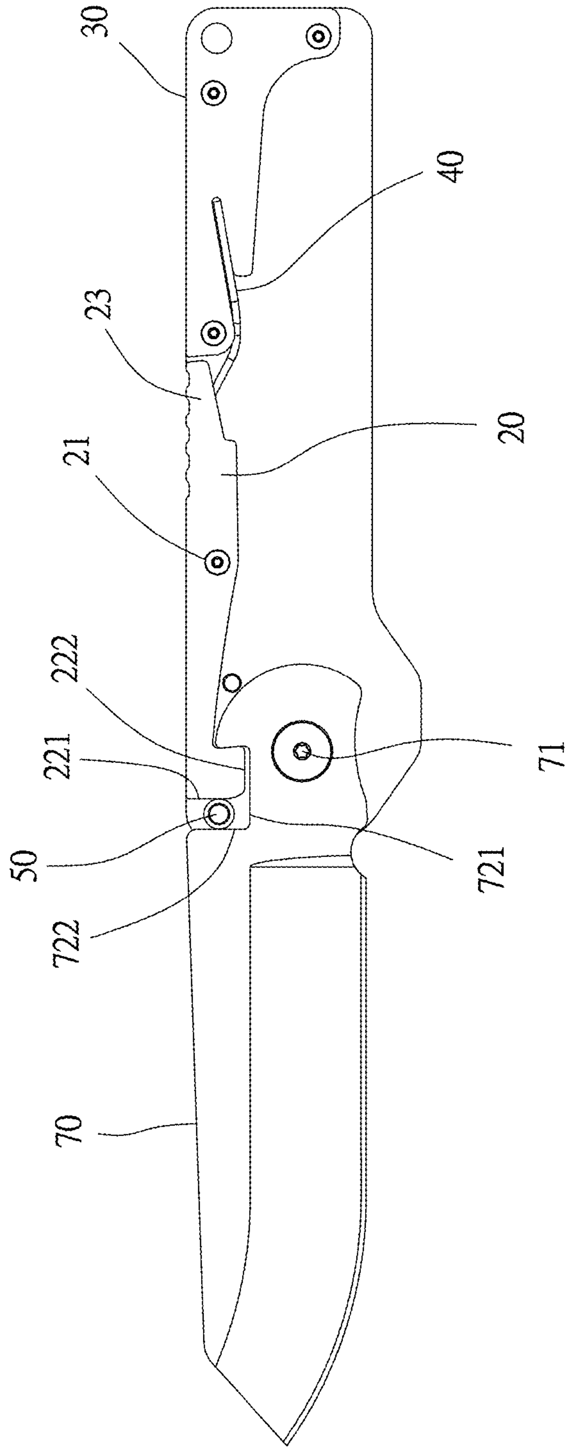
FIG. 4 is a side view of the present invention after removal of the outer covers.
Figure 5:
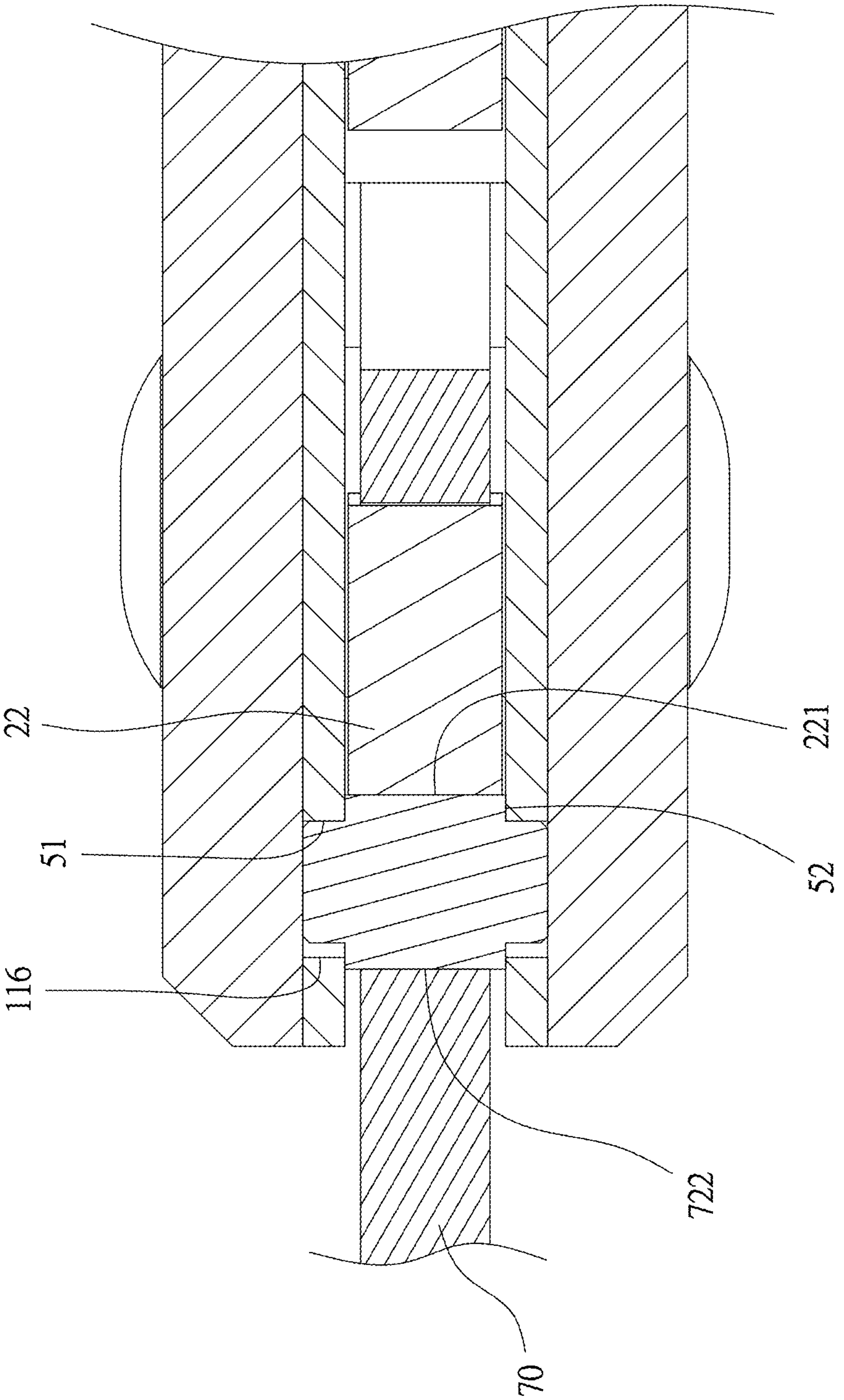
FIG. 5 is a cross-sectional view taken along line 5-5 in FIG. 1.
Figure 6:
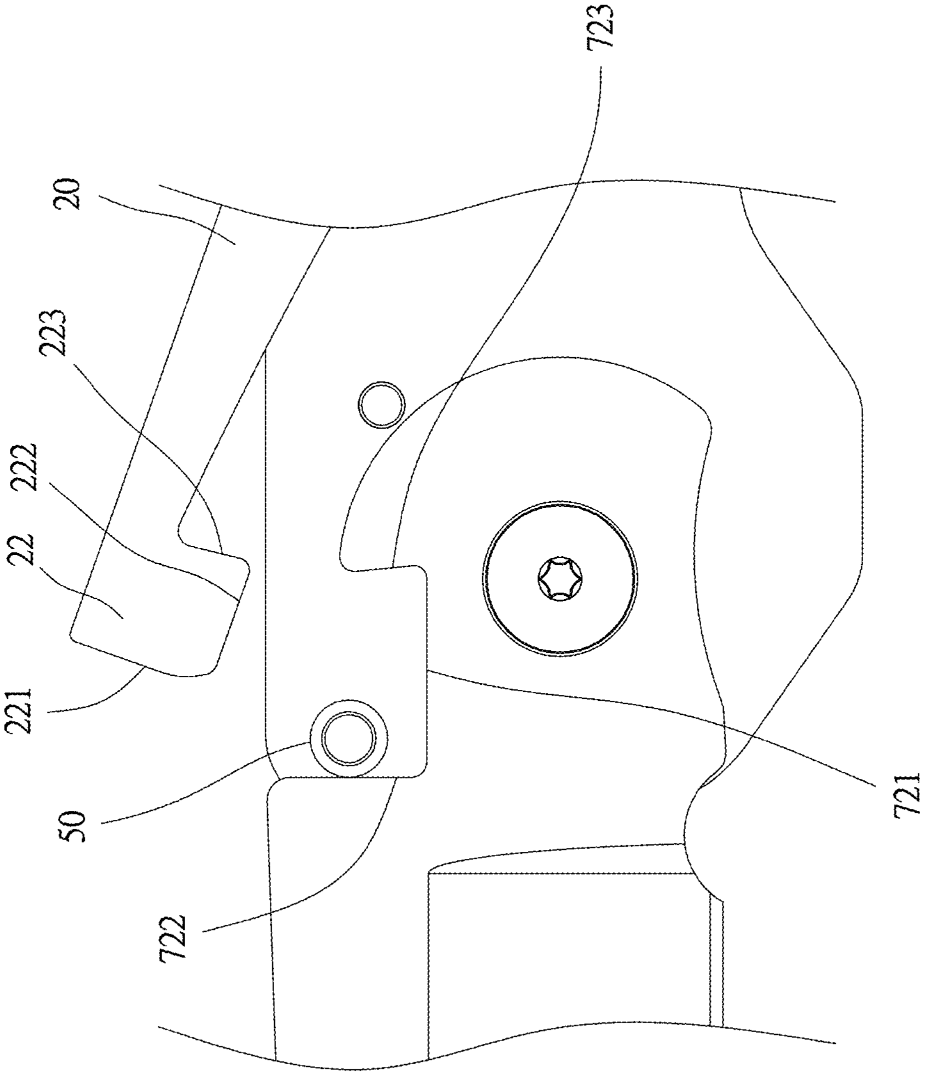
FIG. 6 is similar to FIG. 4 and is an enlarged schematic diagram of the pivot position of the cutting blade and the knife handle.
Figure 7:
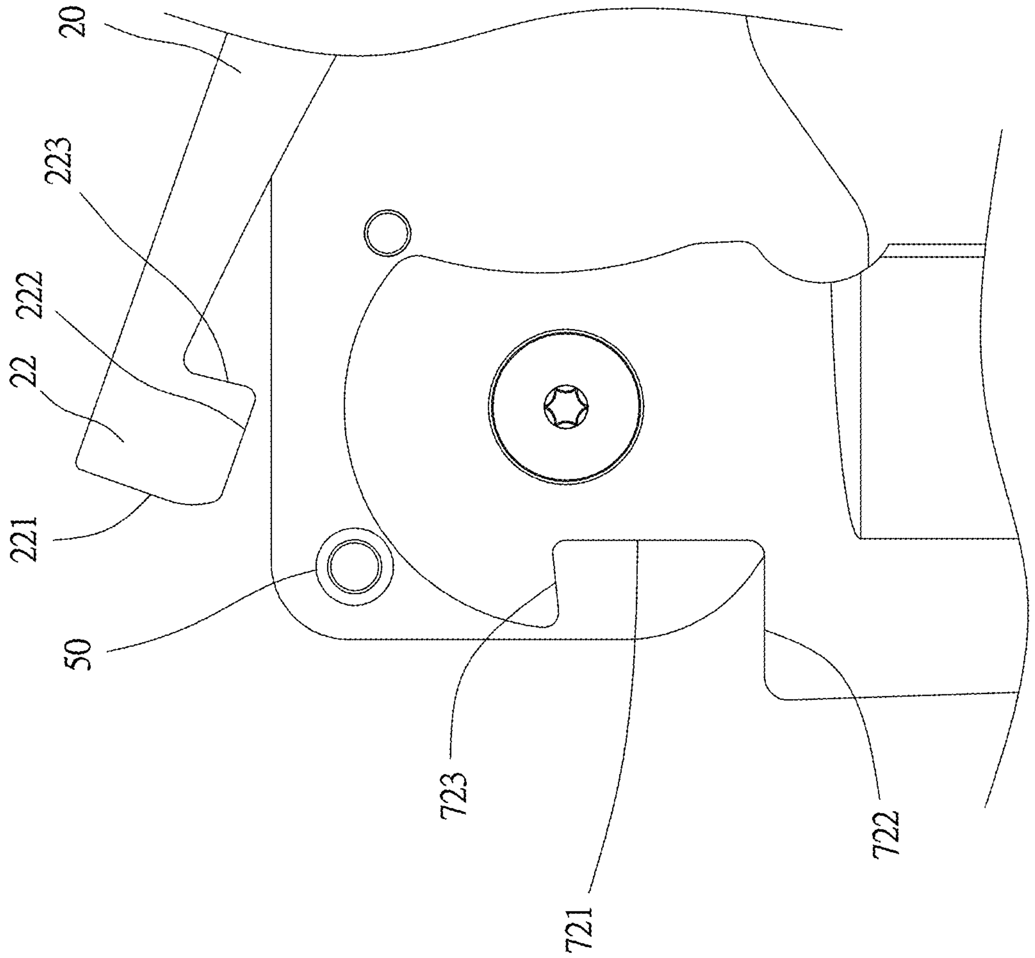
FIG. 7 is similar to FIG. 6 and is an enlarged schematic diagram of the pivot position of the cutting blade and the knife handle.
Figure 8:
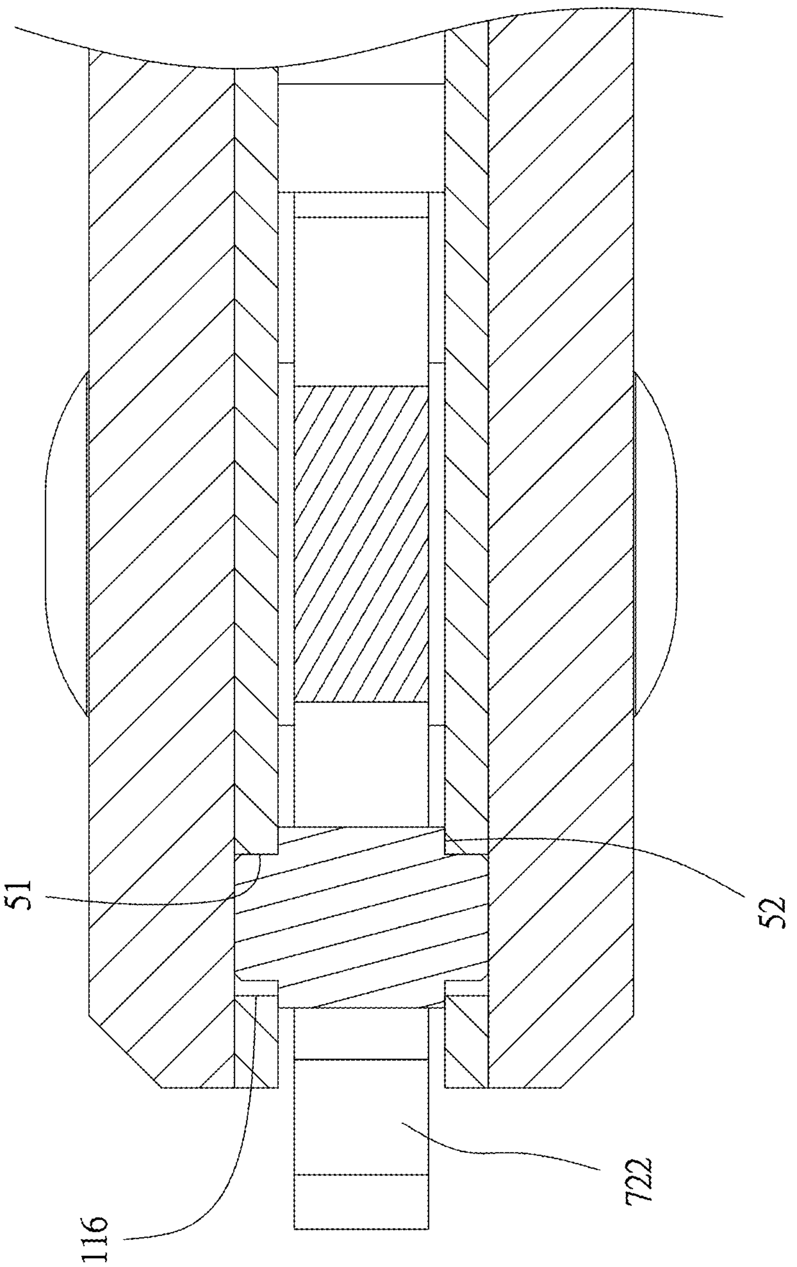
FIG. 8 is similar to the cross-sectional view of FIG. 5, showing the cross-sectional view of FIG. 7 when the cutting blade is folded.
Figure 9:
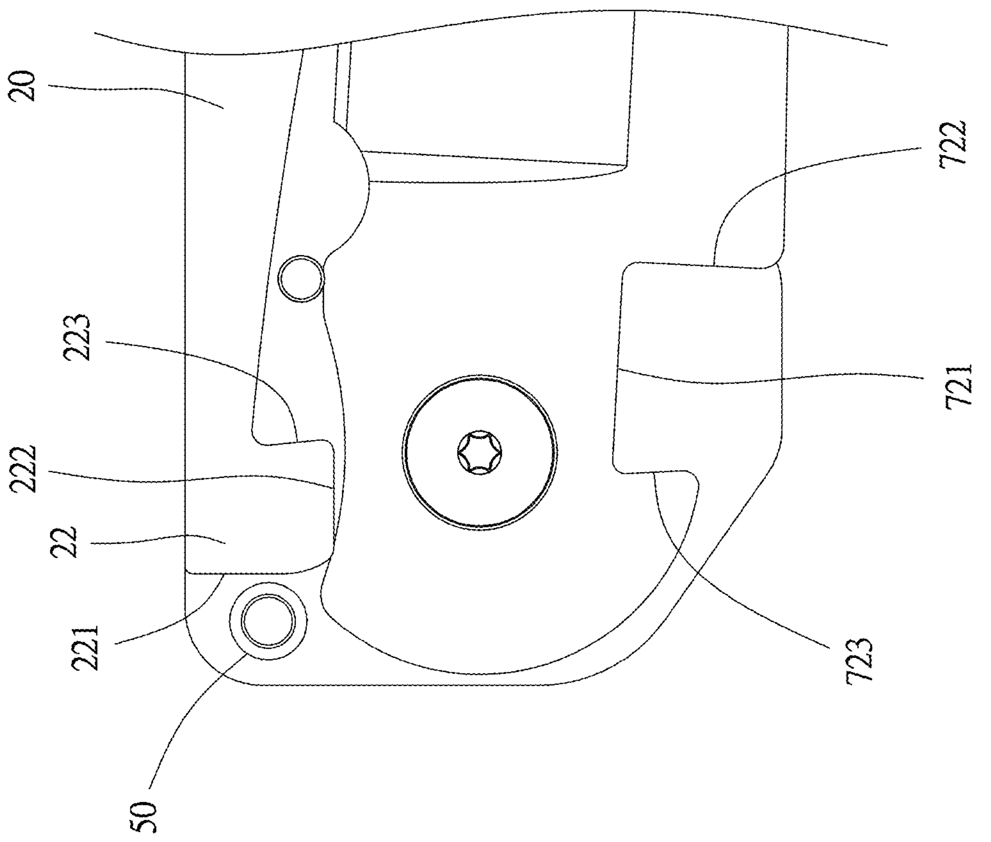
FIG. 9 is similar to FIG. 6 and is an enlarged schematic diagram of the pivot position of the cutting blade and the knife handle.
Figure 10:
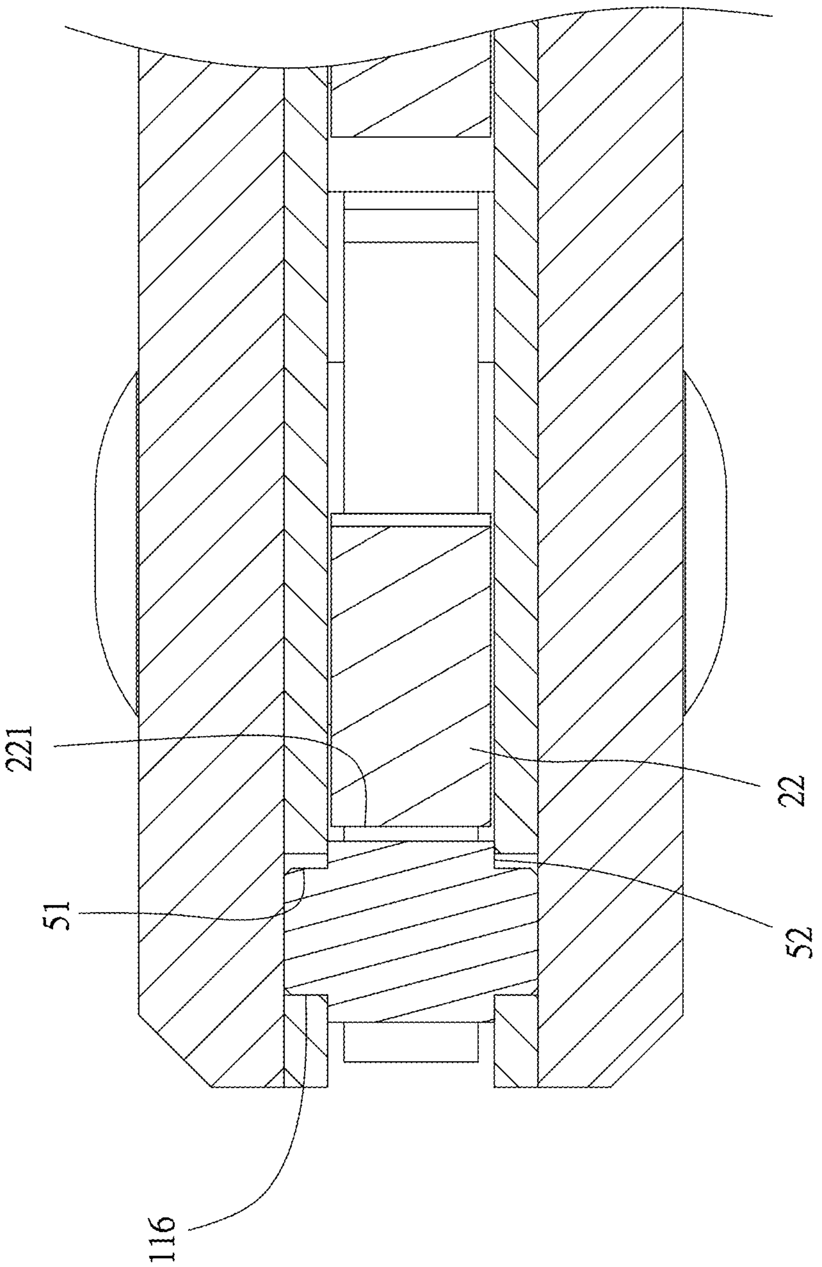
FIG. 10 is similar to the cross-sectional view of FIG. 5, showing the cross-sectional view of the locking column and the locking portion after the cutting blade in FIG. 9 is folded.

According to the structure of the present invention, the cutting blade 70 of the present invention has a structure as shown in FIG. 1 and FIG. 4 when in the extended position. When the cutting blade is in the extended position, the locking bolt 50 and the locking portion 22 of the swing arm 20 are both located in the locking groove 72 of the cutting blade, and the front stop wall 722 of the locking groove pushes the locking bolt 50 to move along the elongated hole 116 toward the rear stop wall 723, so that the small diameter sections 51 of the locking bolt abut against the ends of the elongated holes 116 away from the front stop wall 722, the front abutting surface 221 of the swing arm locking portion abuts against the locking bolt 50, and the rear abutting surface 223 of the swing arm locking portion abuts against the rear stop wall 723 of the locking groove to form a continuously engaged locking state.

The design of the present invention is characterized in that: First, the locking groove front stop wall forms a continuous pushing and locking state with the locking bolt, the locking portion and the rear stop wall, so that the locking can be stable. Secondly, the front stop wall of the locking groove pushes the locking bolt to move along the elongated holes toward the rear stop wall, and the small diameter sections of the locking bolt press against the ends of the elongated holes away from the front stop wall. Therefore, if the cutting blade is subjected to greater pressure during use, the pressure of the cutting blade will be transmitted to the locking bolt and borne by the locking bolt and distributed to the two side plates through the elongated holes, so the locking portion will not be affected.

When the cutting blade is to be folded, the pressing portion 23 of the swing arm is pressed first to make the locking portion 22 withdraw from the locking groove 72 of the cutting blade, as shown in FIGS. 6 to 9. At this time, the cutting blade 70 can rotate with the pivot 71 as the axis and folded to a position between the two side plates 11. Release the pressing portion 23, and the locking portion 22 of the swing arm returns to its original position due to the restoring force provided by the elastic element 40. At this time, because the locking groove 72 of the cutting blade has rotated and left its original position, the locking bolt 50 can move along the elongated holes 116 toward the ends away from the locking portion 22, and more space can be left to make the locking portion 22 return more smoothly, which is also a feature different from the previous products of the present invention.

What is claimed is:

1. A convenient portable knife comprising: a cutting blade and a knife handle, wherein:

said knife handle comprises two side plates, a swing arm, a reinforcing plate, an elastic element, a locking bolt and two outer covers, each said side plate comprising an inner side, an outer side, a pivot hole located at one end thereof for said cutting blade to pivot, an axle hole and an elongated hole, said swing arm being sandwiched between the said inner sides of said two side plates, said swing arm comprising a pivot pivoted to the said axle holes of said two side plates, a locking portion located at one end thereof and a pressing portion located at an opposite end thereof, said locking portion and said pressing portion being located on opposite sides of said pivot, said locking portion being adjacent to the said elongated holes of said two side plates, said reinforcing plate being sandwiched between the said inner sides of said two side plates, said elastic element being disposed on said reinforcing plate and between said two side plates, said elastic element being pressed against said pressing portion of said swing arm with one end thereof to provide a restoring force when said pressing portion is pressed, said locking bolt being located between said two side plates, said locking bolt being inserted through the said elongated holes of said side plates so that said locking bolt is movable along a long axis of the said elongated holes, said two outer covers being respectively provided on the said outer sides of said two side plates so that said two side plates are located between said two outer covers;

said locking portion comprises a front abutting surface, a bottom surface and a rear abutting surface, said bottom surface protruding from one side of said swing arm, said front abutting surface and said rear abutting surface being respectively located at two opposite ends of said bottom surface;

said cutting blade is located between the said inner sides of said two side plates, said cutting blade comprising a pivot located at one end thereof and pivoted to the said pivot holes of said two side plates so that said cutting blade is rotatable around the pivot thereof to switch between an extended position and a folded position, said cutting blade further comprising a locking groove at the end where the pivot of said cutting blade is located, said locking groove corresponding to the positions of the said elongated holes of said two side plate when said cutting blade is in said extended position;

when the cutting blade is in the extended position, the locking bolt and the locking portion of the swing arm are both located in the locking groove of the cutting blade, a front stop wall of the locking groove abuts against the locking bolt, and the locking bolt abuts against the front abutting surface of the locking portion and the rear abutting surface abuts against a rear stop wall of the locking groove to form a continuously engaged locking state.

2. The convenient portable knife as claimed in claim 1, wherein said locking groove is a groove formed by a bottom, a front stop wall and a rear stop wall.

3. The convenient portable knife as claimed in claim 1, wherein said locking bolt comprises a small diameter section with a smaller outer diameter at each of two opposite ends thereof to form a respective shoulder surface with a reduced outer diameter, said locking bolt being respectively penetrated through the said elongated holes of said side plates by said two small diameter sections.

4. The convenient portable knife as claimed in claim 1, wherein each said side plate is provided with a recess on one side thereof.

5. The convenient portable knife as claimed in claim 4, wherein each said outer cover is also provided a recess on one side thereof at a position corresponding to the said recesses of said two side plates.

6. The convenient portable knife as claimed in claim 4, wherein said pressing portion is provided with an anti-slip strip that is located at positions corresponding to the said recesses of said two side plates.

7. The convenient portable knife as claimed in claim 1, wherein each said outer cover is also provided with a pivot hole at a position corresponding to the said pivot hole of the respective said side plate.

* * * * *